United States Patent [19]

Labiche et al.

[11] Patent Number: 5,241,610
[45] Date of Patent: Aug. 31, 1993

[54] OPTICAL SWITCHING IN A FIBER COMMUNICATION SYSTEM AND METHOD USING SAME

[75] Inventors: Michael J. Labiche; Gary W. Lyons, both of Alpharetta; Ronald J. Hanson, Duluth, all of Ga.

[73] Assignee: Scientific-Atlanta, Inc., Norcross, Ga.

[21] Appl. No.: 753,952

[22] Filed: Sep. 3, 1991

[51] Int. Cl.$^5$ .............................. G02B 6/28; G02F 1/00
[52] U.S. Cl. ........................................ 385/16; 385/24; 385/88; 385/89; 359/118; 359/128; 359/133; 359/154; 359/188; 359/189
[58] Field of Search .................. 385/16, 17, 20, 24, 385/40, 41, 42, 46, 48, 88, 89; 359/173, 154, 152, 188, 189, 195, 133, 118, 128

[56] References Cited

U.S. PATENT DOCUMENTS

| | | | |
|---|---|---|---|
| 4,341,438 | 7/1982 | Seki et al. | 385/16 |
| 4,834,483 | 5/1989 | Arthurs et al. | 359/173 |
| 4,956,835 | 9/1990 | Grover | 370/16 |
| 4,973,169 | 11/1990 | Slonecker | 385/24 |
| 5,065,454 | 11/1991 | Binz et al. | 359/184 |
| 5,069,521 | 12/1991 | Hardwick | 385/24 |
| 5,134,672 | 7/1992 | Imoto et al. | 385/16 |
| 5,136,666 | 8/1992 | Anderson et al. | 385/24 |
| 5,146,514 | 9/1992 | Birk | 385/24 |
| 5,170,451 | 12/1992 | Oshima | 385/24 X |
| 5,175,777 | 12/1992 | Böttle | 385/16 X |

FOREIGN PATENT DOCUMENTS 0311772 4/1989 European Pat. Off. ......... 385/16 X

OTHER PUBLICATIONS

William D. Grover, "The Selfhealing Network" in IEICE Global Telecommunications Conference, vol. 2 pp. 1090–1095, (Nov. 15–18, 1987).
Michael Labiche, "Fiber-Optic Switch For CATV Systems", 1990 NCTA Technical Papers 339–42 (May 21, 1990).
P. Duthie et al., "Optical Technologies, Systems and Networks Design of Broadband Networks Using Electro-Optic Switching Technology", IEEE International Conference on Communications, vol. 1, 1.3.1–1.3.5 (Jun. 12–15, 1988).

*Primary Examiner*—Brian Healy
*Attorney, Agent, or Firm*—William A. Marvin; Frederick W. Powers, III

[57] ABSTRACT

A fiber optics communications system and method are provided. The system includes a transmitter apparatus located at a first location and having a plurality of laser transmitters and a plurality of optical switches coupling optical signals from the laser transmitters to optical fibers. A receiver apparatus is located at a second location remote from the first location and includes a plurality of receivers and a plurality of optical switches coupling optical signals from the optical fibers to the optical receivers. A first control circuit controls the switches of the transmitter apparatus in accordance with conditions at the first and the second locations. A second control circuit controls the switches of the receiver apparatus in accordance with conditions at the first and second locations. The backing up of a plurality of transmitting lasers by a single back up laser and the backing up of a plurality of receivers by a single back up receiver are also described.

27 Claims, 9 Drawing Sheets

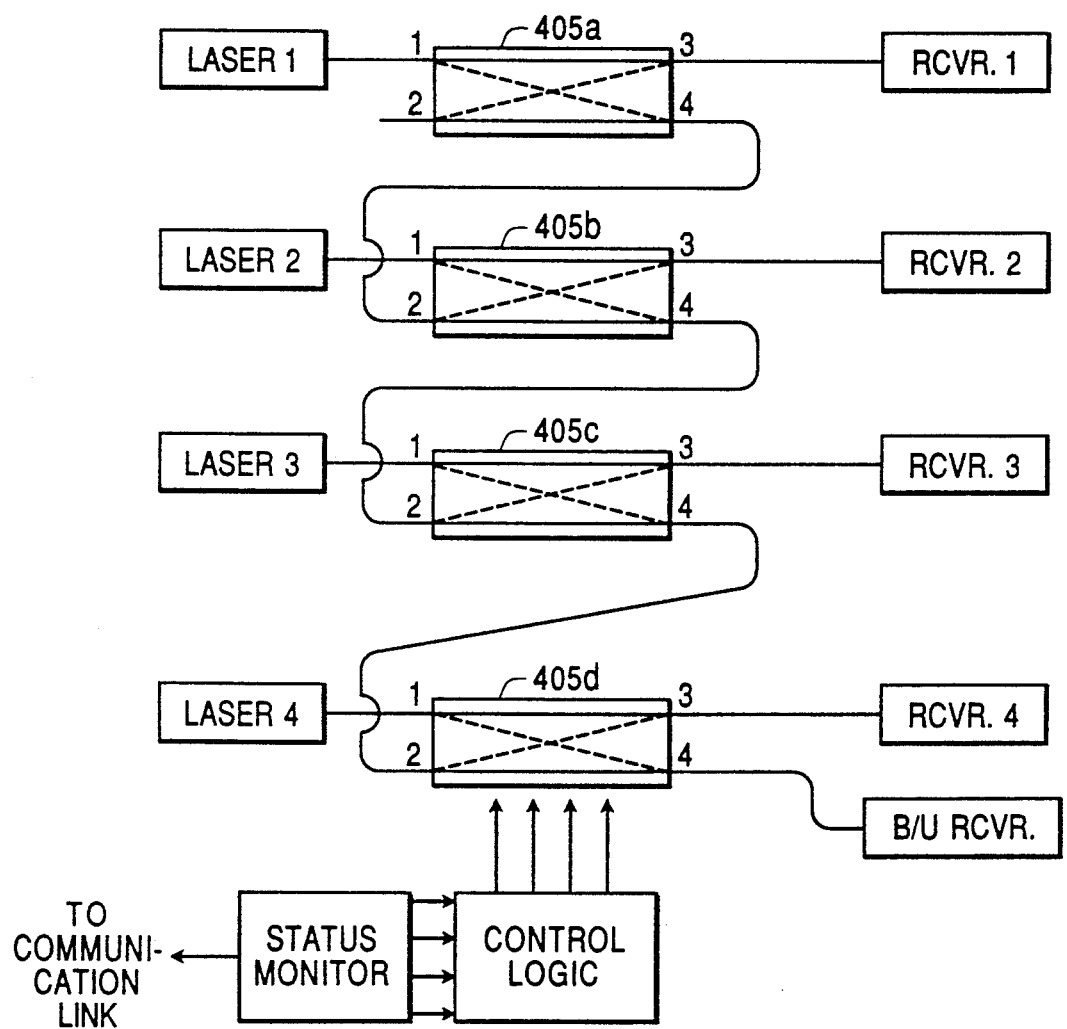

OPTICAL SWITCHING IN A FIBER COMMUNICATION SYSTEM AND METHOD USING SAME

TECHNICAL FIELD

The present invention generally relates to optical switching and, more particularly, to optical switching in fiber communication systems.

BACKGROUND OF THE INVENTION

With reference to the article "Fiber Optic Switch for CATV Systems," 1990 NCTA Technical Papers, p. 339, an optical switch is a four port two state device which permits the connection of either input port to either output port. As shown in FIG. 1A, in the bar state, port 1 feeds port 2 and port 4 feeds port 3. In the cross state shown in FIG. 1B, port 1 feeds port 3 and port 4 feeds port 2. The transition between bar and cross state constitutes switching.

The implementation of optical switching in fiber video systems has been limited by significant insertion losses and signal degradation associated with such switches. These factors have limited the quality of signals which may be delivered using such systems. It is possible to perform switching by converting the optical signal to an electrical signal, performing the necessary switching, and converting the electrical signals back to optical signals. Typically, such signal switching is performed in a CATV system using RF A/B switches. However, such switches generally suffer from crosstalk and have a significant insertion loss, also limiting the ability to deliver high quality video signals.

The above-referenced article describes a commercially available optical switch which overcomes these deficiencies. Switching is achieved in this switch through the perturbation of a 2×2 fiber optic coupler. A three index tapered glass structure is made up of two fibers inserted into a tube of a third refractive index which is then necked down to a radius suitable to achieve a desired degree of coupling. For the switch application, a coupler is fabricated such that 100 percent of the light is coupled from the input fiber to the second fiber. With bending, the percent of light coupled to the second fiber can be varied from 100 percent to 0 percent. This arrangement provides a switch with low optical losses, low back reflection, and high reliability.

The switch may be switched either manually via a switch, for example, or electronically. The switching is accomplished by solenoids which are physically mounted such that one solenoid attracts a permanent magnet in the coupler carriage, while the other solenoid opposes the polarity of the permanent magnet mounted on the other side of the coupler carriage. This produces a lateral translation of the coupler carriage and bends the coupler, switching the light input to the other port. The carriage remains latched in this position until switched again. A switch state signal indicates which state (cross or bar) the switch is in.

SUMMARY OF THE INVENTION

Accordingly, it is an object of the present invention to utilize an optical switch in a fiber communication system.

It is another object of the present invention to provide an arrangement of optical switches responsive to system conditions for providing back up and redundancy in the case of failure of system components.

It is another object of the present invention to provide an arrangement of optical switches which permits a single laser transmitter to back up a plurality of laser transmitters.

It is another object of the present invention to provide an arrangement of optical switches which permits a single optical receiver to back up a plurality of optical receivers.

It is another object of the present invention to provide an arrangement of optical switches which permits back up of optical fibers.

In accordance with the present invention, transmitter apparatus and method for transmitting optical signals are provided. The transmitter apparatus includes a plurality of primary transmitting lasers and a back up laser for respectively generating optical signals for output to optical fibers. A plurality of optical switches couple optical signals from said primary and back up lasers to the optical fibers. A control circuit controls the optical switches such that an optical signal generated by the back-up transmitting laser is selectively output to any of the optical fibers to replace an optical signal of one of the transmitting lasers.

Also in accordance with the present invention, a receiver apparatus and method for receiving a plurality of optical signals are provided. The receiver apparatus includes a plurality of primary receivers and a back up receiver for respectively receiving a plurality of optical signals. A plurality of optical switches couple optical signals from said optical fibers to said primary and back up receivers. A control circuit controls the optical switches such that a received optical signal may be selectively input to the back-up receiver.

Additionally, a fiber optics communications system and method are provided. The system includes a transmitter apparatus located at a first location and having a plurality of laser transmitters and a plurality of optical switches coupling optical signals from the laser transmitters to optical fibers. A receiver apparatus is located at a second location remote from the first location and includes a plurality of receivers and a plurality of optical switches coupling optical signals from the optical fibers to the optical receivers. A first control circuit controls the switches of the transmitter apparatus in accordance with conditions at the first and the second locations. A second control circuit controls the switches of the receiver apparatus in accordance with conditions at the first and second locations.

This system offers great flexibility in terms of back up and redundancy with a minimum of extra components. For example, a single laser and a single receiver may respectively provide back up for a plurality of transmitters and receivers. Additionally, it can be seen that the switches can be controlled based on local and/or remote conditions.

BRIEF DESCRIPTION OF THE DRAWINGS

A more complete appreciation of the present invention and many of the attendant advantages thereof will be readily obtained by reference to the following detailed description when considered in connection with the accompanying drawings wherein:

FIGS. 5A is a system block diagram of a second embodiment of the invention.

DETAILED DESCRIPTION OF THE PREFERRED EMBODIMENTS

Figure 1A:
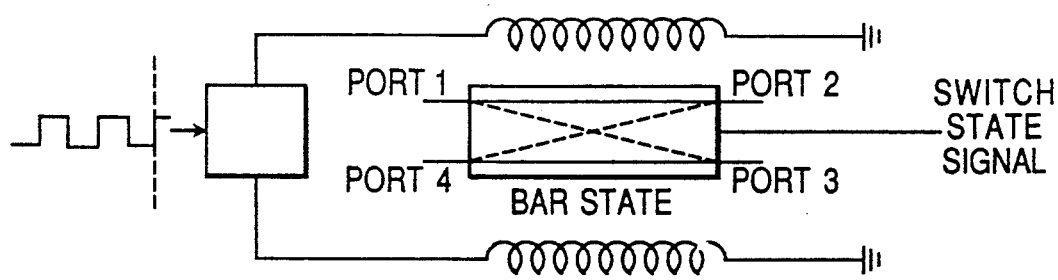
FIGS. 1A and 1B are pictorial representations respectively illustrating the bar and the cross states of an optical switch.
Figure 1B:
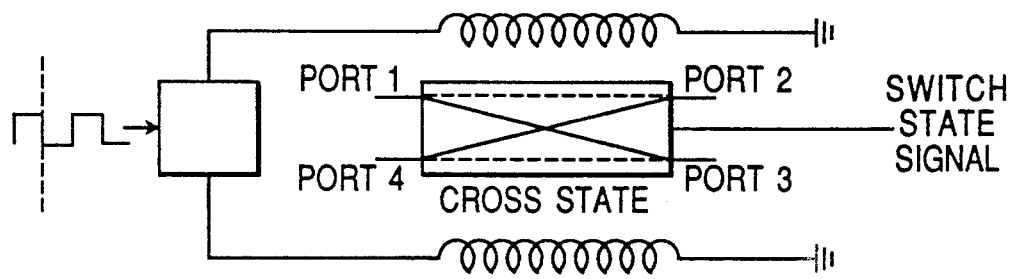
Figure 2:
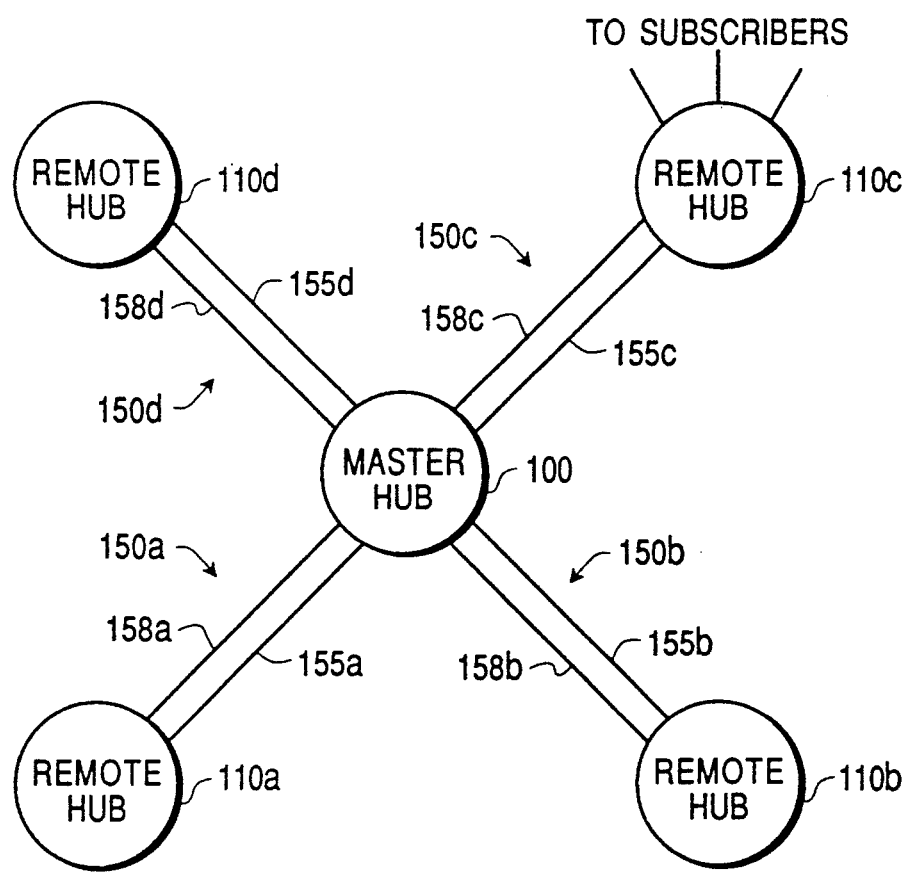
FIG. 2 is a system block diagram of a fiber communication system.

With reference to FIG. 2, a fiber communications system will be described. The communication system includes a master hub 100 and remote hubs 110a-d connected to master hub 100 via bidirectional fiber links generally indicated as 150a-d. Each bidirectional link includes a forward path 155 and a reverse path 158. Each forward path 155a-d includes one or more optical fibers. Each reverse path also includes one or more optical fibers. Master hub 100 may be located at the headend of a CATV fiber system and typically includes a plurality of transmitters for transmitting optical signals over fibers of forward path 155 to optical receivers at remote hubs 110a-d. Remote hubs 110a-d are located remote from master hub 100 and typically include a plurality of receivers to convert optical signals from the master hub to RF signals for distribution to subscribers. Alternatively, one or more remote hubs may include transmitters for transmitting the optical signals received from the master hub to additional remote hubs.

Figure 3:
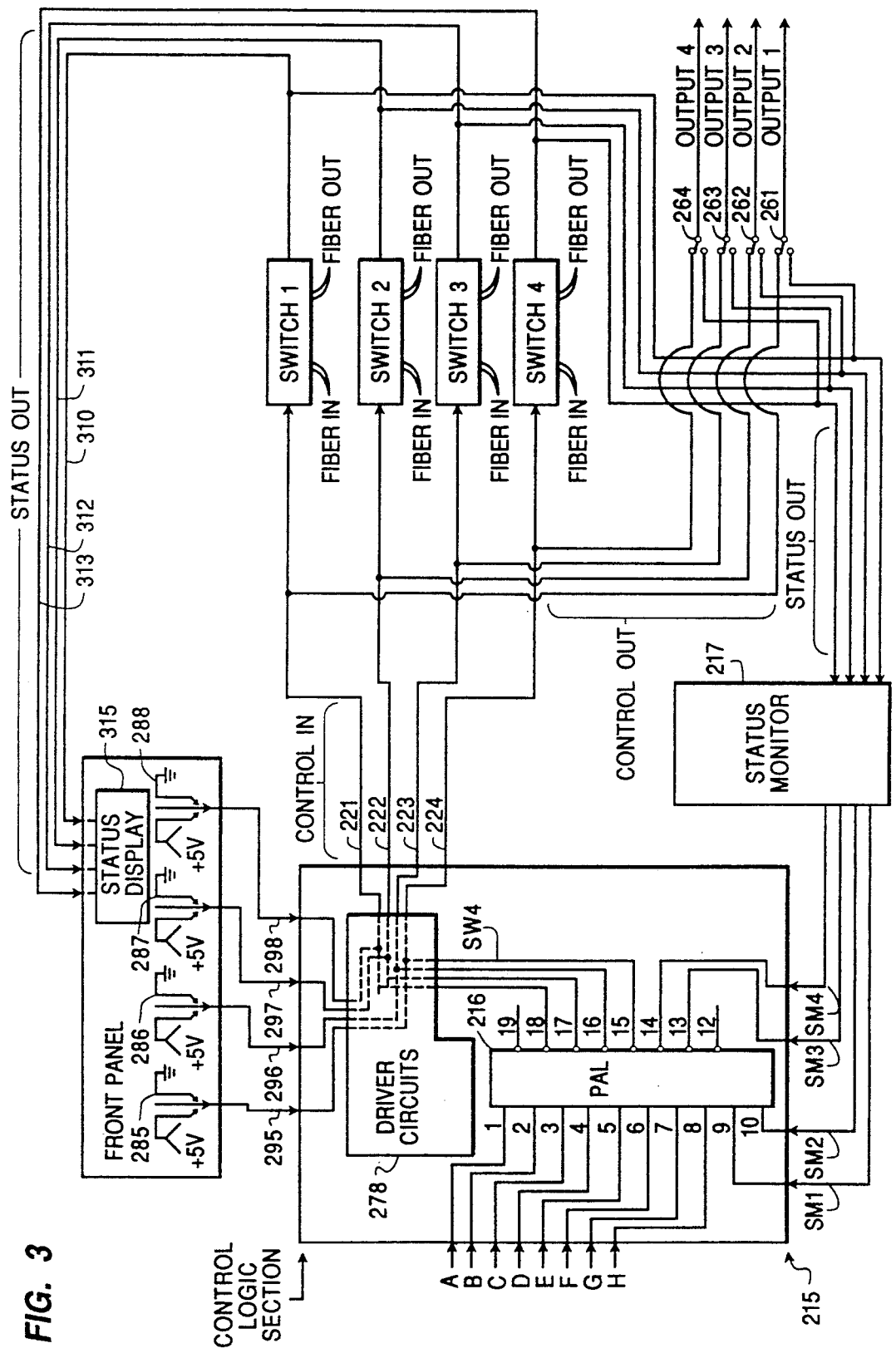
FIG. 3 is a diagram of switching control circuitry in accordance with the present invention.

FIG. 3 is a block diagram of a switching control associated with, for example, master hub 100 or remote hubs 110. The switching of optical switches 1-4 in accordance with the present invention is controlled by control logic section 215 including a twenty pin Programmable Array Logic (PAL) 216. PAL 216 is a model 16L8AMJ available from Monolithic Memories, Inc., although the invention is not limited in this respect. In a currently preferred, but nonetheless merely illustrative embodiment, twelve inputs (A, B, C, D, E, F, G, H, SM1, SM2, SM3, and SM4) are utilized to determine the status of four output lines (SW1, SW2, SW3, and SW4) for controlling optical switches 1-4. The pins of PAL 216 are assigned as follows:

is improperly operating. As discussed below, PAL 216 may be programmed to control optical switches to bring a back up laser on line when a fault condition of a primary laser is detected. At a receiver location, inputs A-H may include a fault condition generated when one or more primary optical receivers are improperly operating. As discussed below, PAL 216 may be programmed to bring a back up receiver on line when a fault condition of a primary receiver is detected.

Inputs SM1-SM4 are TTL inputs which represent so-called "remote" conditions. In a preferred embodiment, the remote conditions ar provided over a communication link by a status monitor/control system as described in a commonly assigned application entitled "Status Monitor/Control System for a Fiber Optical Communications System" application Ser. No. 07/753,581 and incorporated herein by reference. Thus, a switch position may be determined in accordance with conditions at other locations in the system. For example, it may not be desirable to change the state of a switch at a first location from bar to cross if a switch at a second location is in the bar state, even if local conditions would normally dictate such a change. This may be achieved via the status monitor/control system by maintaining one or more of lines SM1-SM4 at a level which causes PAL 216 to maintain the switch in the bar state regardless of local inputs.

The present invention affords great flexibility to a system operator who may program the control logic to implement particular switching actions upon the occurrence of particular events, these events including conditions both local and remote. This is important since a typical fiber optical system includes a number of transmitters, receivers, and other units for delivering the optical signals. The status monitoring system provides an operator with information as to what is happening at each of these locations, e.g., temperature, operating voltages, etc. This information is sent back to a central location. As noted above, based on this information, a PAL at one location may be controlled in a particular manner based on the occurrence of some event a different location.

With reference to FIG. 3, local input is provided to PAL 216 of control logic section 215 on eight lines A-H. As noted, such local inputs may be signals such as fault signals from other components in the same location. For example, at a transmitter location, the fault/no fault condition of the transmitting lasers may be supplied on the local data lines. At a receiver location, the fault/no fault condition of the receivers may be sup-

| PINS | 1 | 2 | 3 | 4 | 5 | 6 | 7 | 8 | 9 | 10 | 11 | 12 | 13 | 14 | 15 | 16 | 17 | 18 | 19 | 20 |
|------|---|---|---|---|---|---|---|---|---|----|----|----|----|----|----|----|----|----|----|----|
|  | A | B | C | D | E | F | G | H | SM1 | GND | SM2 | NC | SM3 | SM4 | SW4 | SW3 | SW2 | SW1 | NC | VCC |

Thus, pin 18 controls switch 1; pin 17 controls switch 2; pin 16 controls switch 3; and pin 15 controls switch 4. The state of these outputs for controlling the switches is determined in accordance with inputs A-H at pins 1-8 and inputs SM1, SM2, SM3, and SM4 at pins 9, 11, 13, and 14 respectively. Pin 20 supplies voltage VCC for chip operation and pin 10 is coupled to ground (not shown in FIG. 2). Pins 12 and 19 are "not connected" (NC) inputs.

Inputs A-H are TTL inputs which represent so-called "local" conditions. For example, at a transmitter location, inputs A-H may include a fault condition generated when one or more primary laser transmitters plied on the local data lines. Input from status monitor/control section 217 is provided on lines SM1, SM2, SM3, and SM4. Thus, PAL 216 of control logic 215 receives a total of twelve inputs. Based on these twelve inputs, PAL 216 makes a decision and sets the levels of control lines 221-224 for controlling optical switch 1, optical switch 2, optical switch 3, and optical switch 4 in an optical switch controller. Illustrative examples will be provided below.

Optical switches 1-4 may be controlled directly via front panel control switches 285, 286, 287, and 288. These switches may, for example, be single pole, double throw switches. A first front panel switch position may control the optical switch to the bar state. A second front panel switch position may control the optical switch to the cross state. A third front panel switch position permits the optical switch to be controlled by PAL 216. As shown in FIG. 3, output lines SW1, SW2, SW3, and SW4 are coupled to front panel switch lines 295, 296, 297, and 298 in driver circuitry 278. When, for example, front panel switch 285 is in the +5 volt position or ground position, the output of control logic section 215 controls switch 4 in accordance with the front panel switch position. When front panel switch 285 is not coupled to either of these potentials, the switching of switch 4 is controlled by PAL 216.

The state of switches 1-4 is provided via status out lines 310-313 to a front panel status display 315 to provide a visual indication of the switch position to an operator. The state of switches 1-4 is also provided to status monitor/control section 217. The Status Out and Control In States of the respective switches 1-4 are provided to switches 261-264. Depending on the position of switches 261-264, the state of Control In signal or of the Status Out signal may be output and supplied for example, a local inputs to another switch control.

Figure 4A:
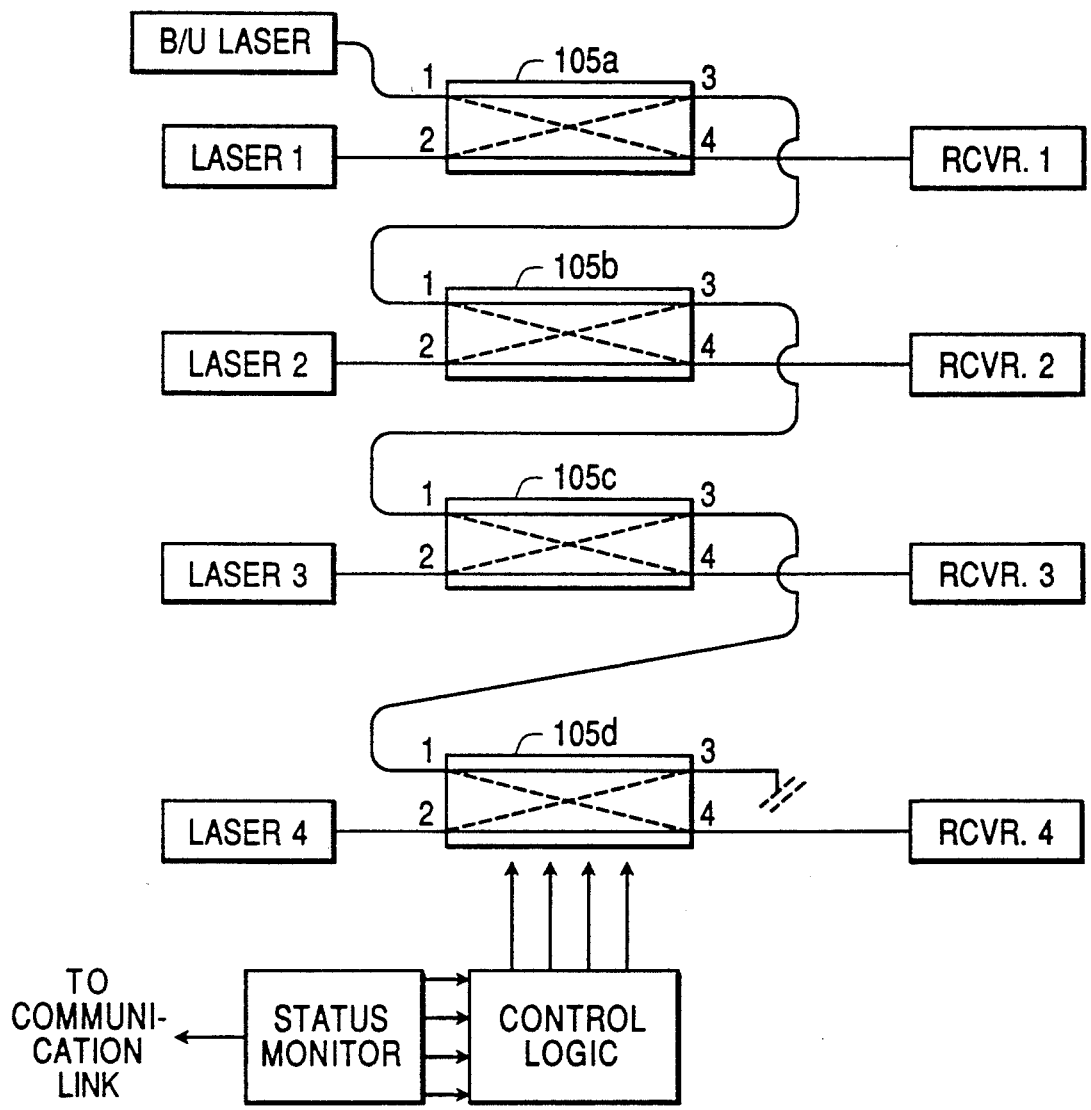
FIG. 4A is a system block diagram of a first embodiment of the invention.
Figure 4B:
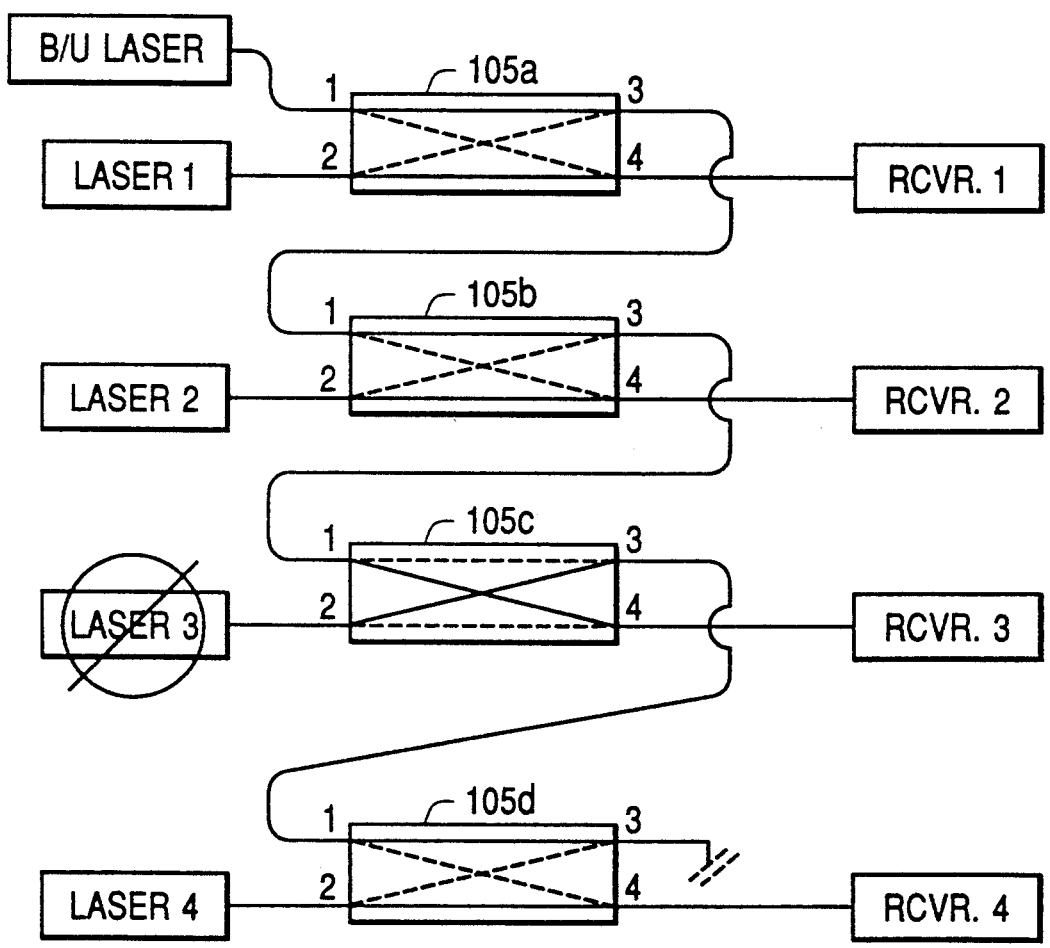
FIGS. 4B, and 4C depict different operations modes of the embodiment of FIG. 4A.
Figure 4C:
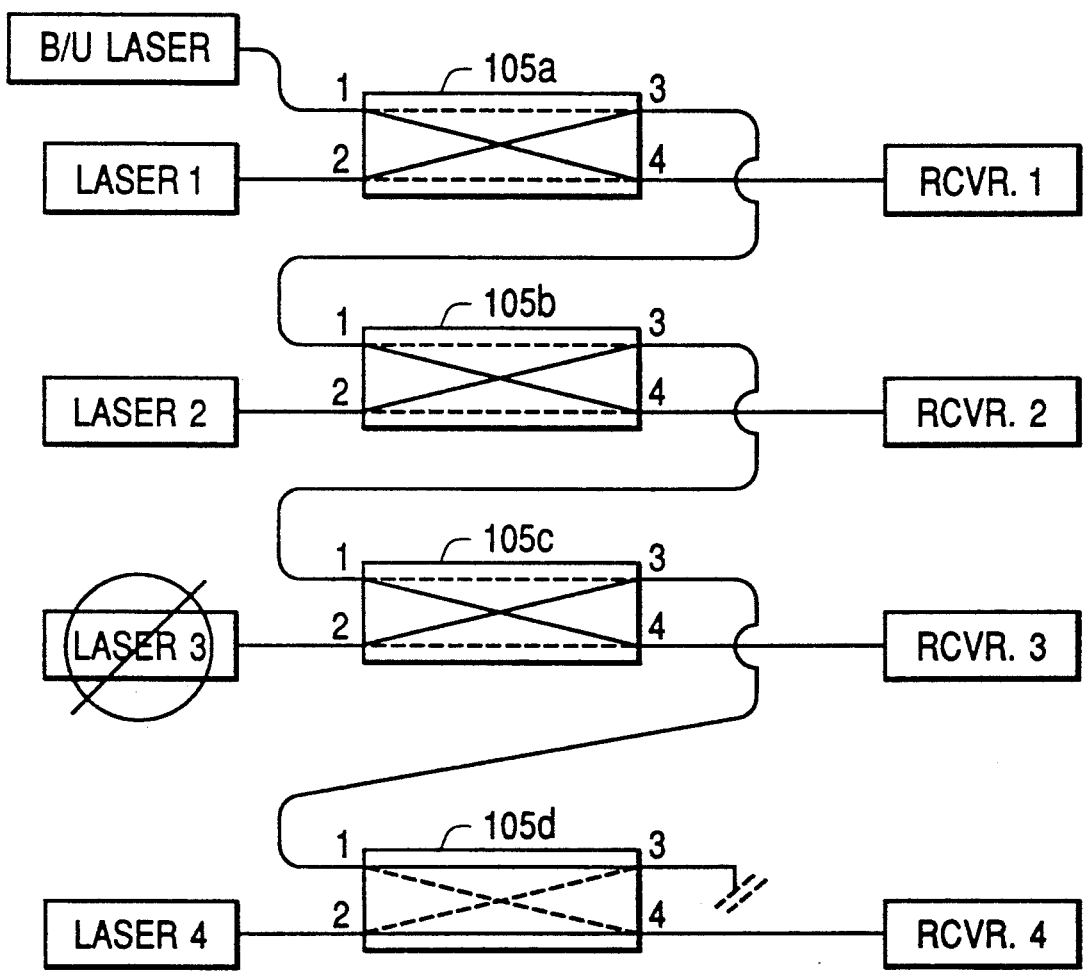

A useful application for the optical switching control of the present invention is in system back-up or redundancy. With reference to FIGS. 4A, 4B, and 4C, a "hot" stand-by back-up transmitter can be switched on line if a failure occurs in the primary system. In FIG. 3A, back-up laser B/U is used to back up a plurality of lasers Laser 1, Laser 2, Laser 3, and Laser 4. The outputs of the lasers are respectively applied to input port 2 of switches 105a-105d. Since switches 105a-105d are in the bar state, the signals from the lasers are output from port 4 of the switches. The output of back-up laser B/U is applied to input port 1 of switch 105a. In the bar state, the back-up laser signal is output from port 3 of switch 105a. This output is supplied to port 1 of switch 105b. Similarly, the output at port 3 of switch 105b is supplied to port 1 of switch 105c. This daisy-chaining is continued until the output at port 3 of switch 105d is supplied to a signal termination point.

In normal operation shown in FIG. 4A, switches 105a-105d are in the bar state. Assume Laser 3 fails as shown in FIG. 4B. Switches 105a and 105b remain in the bar state. However, switch 105c is switched either manually or automatically to the cross state. If done automatically, one of the local inputs to PAL 216 of FIG. 3 indicates a Laser 3 failure. In accordance with the logic programmed into PAL 216, when such a situation occurs, switch 3 is switched to the cross state. Thus, the signal from back-up laser B/U is output from port 4 of switch 105c and system operation may continue while Laser 3 is either repaired or replaced. Such an arrangement provides effective back-up for a plurality of lasers while minimizing system cost and complexity. In particular, only a single back-up laser is required. Although a single back up laser is shown backing up four primary lasers, it will be apparent that this technique may be applied to any number of lasers with the use of an appropriately programmed PAL.

Alternatively, as shown in FIG. 4C, if laser 3 fails, the control logic may implement a "shift down". This shaft down may also be carried out manually. This shift down may be used to reduce the effect of having the back up laser signal supplied through many switches resulting in possible signal loss and degradation. Accordingly, in shift down, switches 105a, 105b, and 1-5c are each switched to the cross state by the control logic. Thus, the output of back-up laser B/U is output at port 4 of switch 105a to receiver 1. The signal from laser 1 is output from port 3 of switch 105a and applied to port 1 of switch 105a. Since switch 105b is in the cross state, the signal of laser 1 is supplied to receiver 2. Similarly, the output of laser 2 is supplied to receiver 3. Thus, laser 3 may be replaced or repaired without signal loss to receiver 3. It can be seen that programming the control logic to implement this switching minimizes the number of switches any one signal must pass through while still permitting a single laser to back-up a plurality of primary lasers.

Figure 5B:
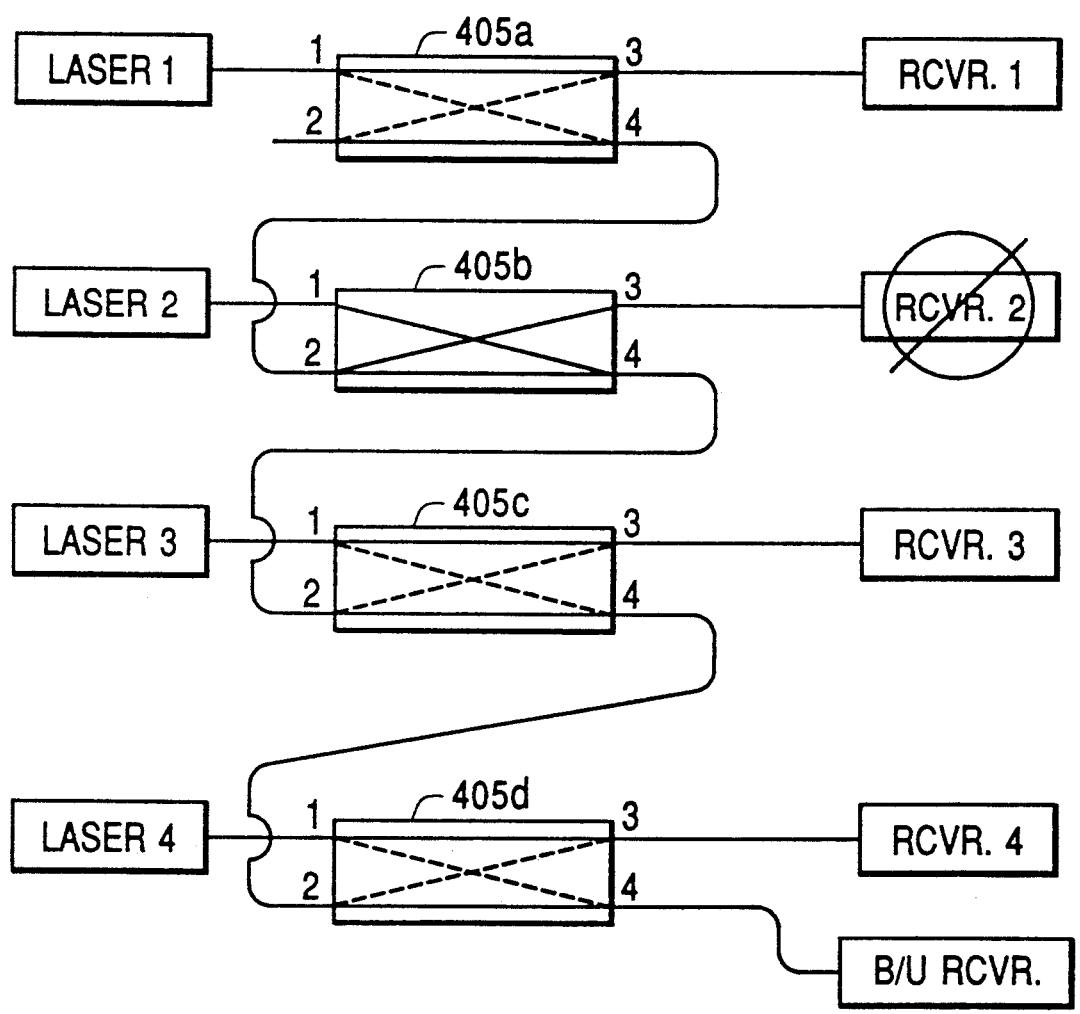
FIGS. 5B, and 5C depict different operational modes of the embodiments of FIG. 5A.
Figure 5C:
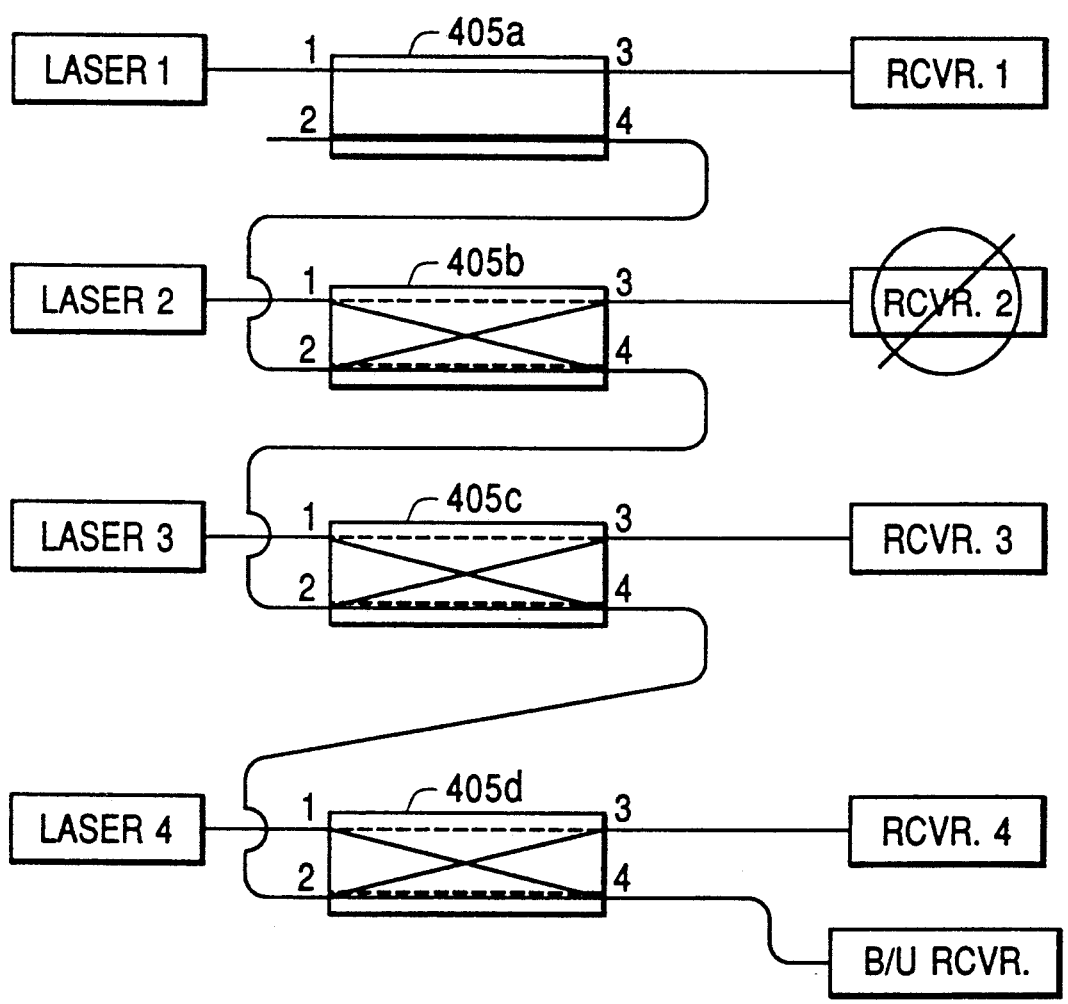

Similarly, as shown in FIGS. 5A, 5B, and 5C, the optical switches may be configured to permit a single receiver to back-up a plurality of receivers. With reference to FIG. 5A, receiver 1, receiver 2, receiver 3, and receiver 4 are backed up by a single back up receiver B/U. In normal operation, switches 405a-405d are each in the bar state. Thus, receiver 1 receives a signal from laser 1, receiver 2 receives a signal from laser 2, receiver 3 receives a signal from laser 3, and receiver 4 receives a signal from laser 4. Assume laser 2 falls as shown in FIG. 5B. Switches 405a, 405c, and 405d remain in the bar state. However, switch 405b is switched to the cross state either manually or automatically. If done automatically, one of the local inputs to PAL 216 indicates a receiver 2 failure. In accordance with the logic programmed into PAL 216, when such a situation occurs, switch 405b is switched to the cross state. Thus, the signal from laser 2 is supplied to back up receiver B/U and the system may continue to operate while receiver 2 is either or replaced.

As with transmitter back up, receiver back up may be switched down to reduce signal degradation due to passage through a number of switches. Thus, in FIG. 5C, if receiver 2 fails, the control logic controls switch 405a to be in the bar state and switches 405b-405d to be in the cross state. Thus, the signal from laser 2 is received by receiver 3, the signal from laser 3 is received by receiver 4, and the signal from laser 4 is received by back up receiver B/U.

Figure 6:
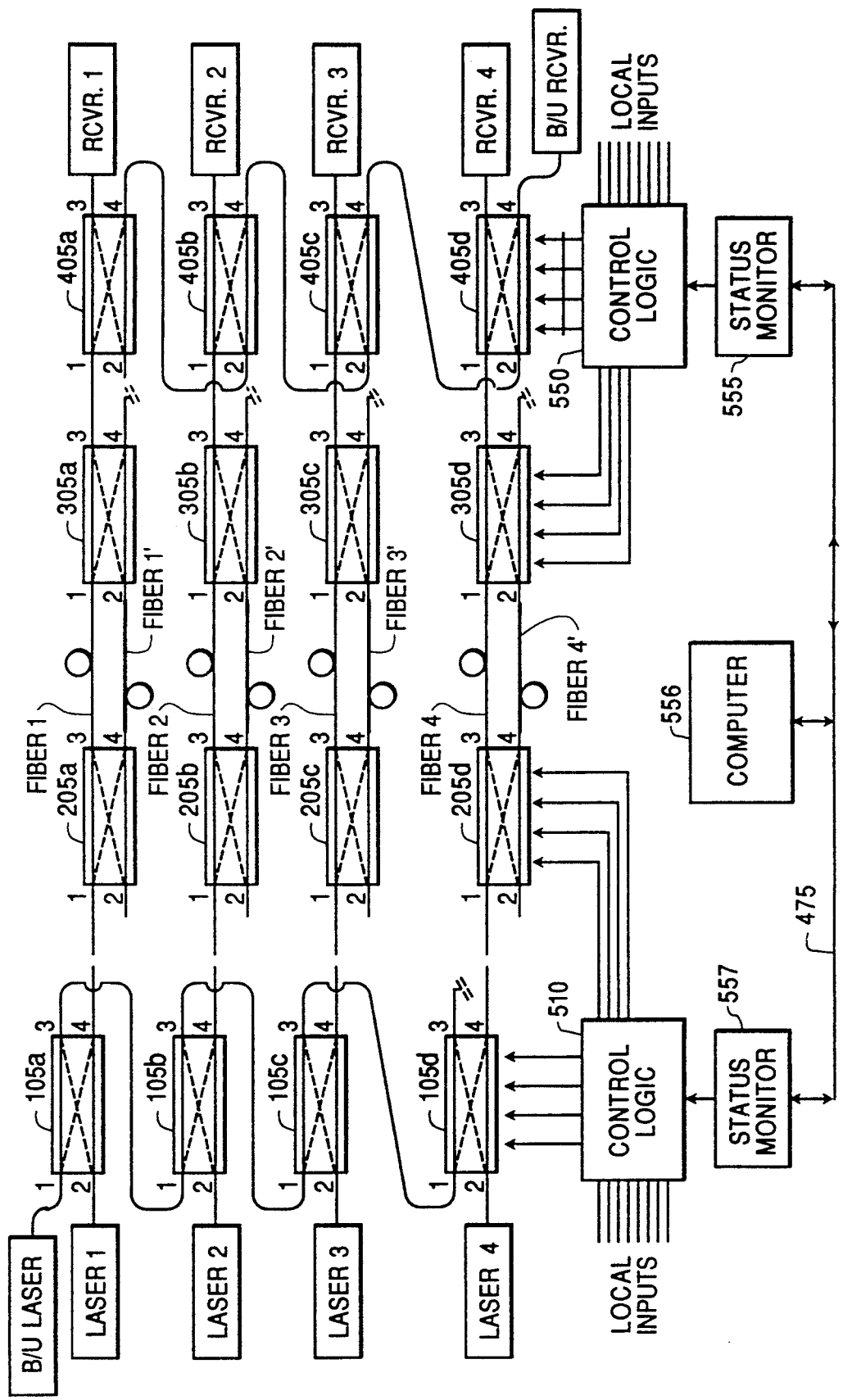
FIG. 6 is a system block diagram of a third embodiment of the present invention.

FIG. 6 illustrates a system incorporating the features of FIGS. 4 and 5, along with optical path back up. Switches 105a-105d are respectively associated with the laser transmitters 1-4 and are controlled by control logic section 510. Switches 205a-205d are respectively associated with primary fibers 1-4 and back up fibers 1'-4' and are also controlled by control logic section 510. Switches 305a-305d are respectively associated with primary fibers 1-4 and back-up fibers 1'-4'. Switches 405a-405d are controlled by control logic section 550. Switches 565a-565d are respectively associated with receiver 1-4 and are controlled by control logic section 550.

Control logic sections 510 and 550 control the associated switches in accordance with information generated locally and, if desired, information at remote locations. Control logic sections 510 and 550 include PALs having the capability of respectively controlling eight switches. For example, if laser 3 fails, a local fault condition supplied to one of inputs A-H of control logic section 510 causes back-up laser B/U to come on line automatically to replace laser 3. This may be accomplished in either of the ways discussed with reference to FIG. 4. Alternatively, this may be accomplished manually controlling the front panel switches. Similarly, if receiver 2 fails, a local fault condition to one of inputs A-H of control logic 550 causes back up receiver B/U to come on line automatically to replace receiver 2. This may be accomplished in either of the ways described with reference to FIG. 5. Alternatively, this may be accomplished manually using front panel switches.

Similarly, a problem or break can occur in one of fibers 1–4. This may be determined, for example, by a detecting that receiver 1 is not receiving a signal even though laser transmitter 1 is operational. The status monitor/control section 555 may determine that the optical power received at receiver 1 is outside the tolerance window and generate a message which is sent to computer 556 over a reverse path 475 in a manner discussed in greater detail in the above-reference commonly assigned application Ser. No. 07/753,581. Computer 556 may then cause one of the control lines respectively coupled to control logics 510 and 550 via status monitors 555 and 557 to go to a predetermined state to cause switches 205a and 305a to switch to the cross state. Thus, the output of laser transmitter 1 would be carried over back up fiber 1'.

It can be seen that the system shown in FIG. 6 offers great flexibility in terms of back up and redundancy with a minimum of extra components. For example, a single laser and a single receiver may respectively provide back up for a plurality of transmitters and receivers. Additionally, it can be seen that the switches can be controlled by information generated locally or at a remote location or both.

The invention has been described in detail in connection with the preferred embodiments. These embodiments, however, are merely for example only and the invention is not restricted thereto. It will be easily understood by those skilled in the art that other variations and modifications can easily be made within the scope of the invention as defined by the appended claims.

We claim:

1. A transmitter apparatus for transmitting a plurality of optical information signals, said transmitter apparatus comprising:
   a plurality of primary transmitting lasers for respectively generating optical information signals for communication over optical fibers;
   a back-up transmitting laser;
   a plurality of optical switches coupling optical information signals from said primary and back-up transmitting lasers to said optical fibers; and control means for controlling said optical switches such that an optical information signal generated by said back-up transmitting laser is selectively output to any of said optical fibers to replace an optical information signal of one of said primary transmitting lasers,
   wherein said optical switches comprise four port, two state optical switches, and
   wherein each optical switch includes first and second input ports and first and second output ports, each of said optical switches receiving a respective information signal from a primary transmitting laser at a first input port and outputting said information signal at a first output port, one of said optical switches receiving an information signal of said back-up transmitting laser at the second input port and another of said optical switches having its second output port coupled to a signal termination point, the second output port of the remaining optical switches being coupled to the second input port of another optical switch.

2. A transmitter apparatus for transmitting optical information signals over an optical fiber network comprising a plurality of optical fibers, said transmitter apparatus comprising:
   primary transmitting lasers for respectively generating optical information signals for communication over optical fibers;
   a back-up transmitting laser for generating optical information signals;
   optical switches for coupling the optical information signals from said primary and back-up transmitting lasers to said optical fibers, each said optical switch having two input ports either of which is connectable to either of two output ports, wherein (1) each optical switch has a first input port coupled to one of said primary transmitting lasers and a first output port coupled to one of said optical fibers, (2) a first optical switch has a second input port coupled to said back-up transmitting laser, (3) a second optical switch different than the first optical switch has a second output port coupled to a signal termination point, and (4) the optical switches other than said second optical switch each have a second input port coupled to a second input port of another optical switch thereby forming a second output-second input connection; and
   control means for controlling said optical switches such that optical information signals generated by said back-up transmitting laser are selectively outputable to any of said optical fibers.

3. The transmitter apparatus according to claim 2, wherein:
   each of said optical switches has a first state wherein its first input port feeds its first output port and its second input port feeds its second output port and a second switch state wherein the first input port feeds its second output port and its second input port feeds its first output port; and
   the second output-second input connections constitute a daisy chain in which said first optical switch is the first optical switch in said daisy chain, said second optical switch is the last optical switch in said daisy chain, and the other optical switches are daisy chained in succession between said first and said second optical switches, whereby optical information signals generated by said back-up transmitting laser may be coupled from one switch to another in said daisy chain via the second output-second input connections.

4. The transmitter apparatus according to claim 3, wherein said control means selectively controls a selected optical switch of said optical switches to be in the second state and controls each of the other optical switches to be in the first state such that:
   (1) said selected optical switch couples the optical information signals generated by said backup transmitting laser, which optical information signals are coupled to said selected optical switch via the second output-second input connections of any optical switches preceding said selected optical switch in said daisy chain, from its second input port to its first output port and thereby to the optical fiber coupled thereto, and couples the optical information signals generated by the primary transmitter coupled to its first input port to its second output port and thereby to the signal termination point via the second output-second input connections of any succeeding optical switches in said daisy chain, and (2) each optical switch other than said selected optical switch couples the optical information signals by the primary transmitter coupled to its first input port to its first output port and thereby to the optical fiber coupled thereto.

5. The transmitter apparatus according to claim 4, further comprising:

fault detection means for detecting a fault in the operation of any one of said primary transmitting lasers, wherein said control means controls said optical switches in response to said fault detection means to thereby replace a primary transmitting laser having a detected fault with said back-up transmitting laser.

6. The transmitter apparatus according to claim 3, wherein said control means selectively controls a selected one of said optical switches and each optical switch preceding said selected optical switch in said daisy chain to be in the second state and controls each optical switch succeeding said selected optical switch in said daisy chain to be in the first state such that:

(1) said selected optical switch and each said optical switch preceding said selected optical switch in said daisy chain respectively couple the optical information signals generated by the primary transmitter to which it is coupled from its first input port to its second output port and thereby to the second input port of the next succeeding optical switch in said daisy chain, or to the signal termination point in the case of the second optical switch, and respectively, couple the optical information signals from its second input port to its first output port and thereby to the optical fiber coupled thereto, and (2) each optical switch succeeding said selected optical switch in said daisy chain couples the optical information signals generated by the primary transmitter to which it is coupled from its first input port to its first output port and thereby to optical fiber coupled thereto, and couples the optical information signals received at its second input port to its second output port and to the second input port of the next succeeding optical switch in said daisy chain, or to the signal termination point in the case of the second optical switch.

7. The transmitter apparatus according to claim 6, further comprising:

fault detection means for detecting a fault in the operation of any one of said primary transmitting lasers, wherein said control means controls said optical switches in response to said fault detection means to thereby replace a primary transmitting laser having a detected fault with said back-up transmitting laser.

8. A receiver apparatus for receiving optical information signals over an optical fiber network comprising a plurality of optical fibers, said receiver apparatus comprising:

primary receivers for respectively receiving optical information signals communicated over optical fibers;

a back-up receiver for receiving optical information signals;

optical switches for coupling the optical information signals from said optical fibers to said primary and back-up receivers, each said optical switch having two input ports either of which is connectable to either of two output ports, wherein (1) each optical switch has a first input port coupled to one of said optical fibers and a first output port coupled to one of said primary receivers, (2) a first optical switch has a second input port coupled to a null terminal, (3) a second optical switch different than the first optical switch has a second output port coupled to said back-up receiver, and (4) the optical switches other than said second optical switch each have a second output port coupled to a second input port of another optical switch thereby forming second outputsecond input connections; and control means for controlling said optical switches such that optical information signals from any one of said optical fibers are selectively receivable by said back-up receiver.

9. The receiver apparatus according to claim 8, wherein:

each optical switch has a first state wherein its first input port feeds its first output port and its second input port feeds its second output port and a second state wherein its first input port feeds its second output port and its second input port feeds its first output port; and the second output-second input connections constitute a daisy chain in which said first optical switch is the first optical switch in said daisy chain, said second optical switch is the last optical in said daisy chain, and the other optical switches are daisy chained in succession between said first and said second optical switches.

10. The receiver apparatus according to claim 9, wherein said control means selectively controls a selected one of said optical switches to be in the second state and controls each of the other optical switches to be in the first state such that:

(1) said selected optical switch couples the optical information signals from the optical fiber coupled to its first input port to its second output port and thereby to the back-up receiver via the second output-second input connections of any optical switches succeeding said selected optical switch in said daisy chain, and (2) each optical switch other than said selected optical switch couples the optical information signals from the optical fibers coupled to its first input port to its first output port and thereby to the primary receiver coupled thereto.

11. The receiver apparatus according to claim 10, further comprising:

fault detection means for detecting a fault in the operation of any one of said primary receivers, wherein said control means controls said optical switches in response to said fault detection means to thereby replace a primary receiver having receiver.

12. The receiver apparatus according to claim 9, wherein said control means selectively controls a selected one of said optical switches and each optical switch succeeding said selected optical switch in said daisy chain to be in the second state and controls each optical switch preceding said selected optical switch in said daisy chain to be in the first state such that;

(1) said selected optical switch and each said optical switch succeeding said selected optical switch in said daisy chain respectively couples the optical information signals received at its second input port to its first output port and thereby to the primary receiver coupled thereto, and respectively couples the optical information signals from the optical fiber coupled to its first input port to its second output port and thereby to the second input port of the next succeeding optical switch in said daisy chain, or to the back-up receiver in the case of said second optical switch, and (2) each optical switch preceding said selected optical switch in said daisy chain respectively couples the optical information signals from the optical fiber coupled to its first input port to its first output port and thereby to primary receiver coupled thereto, and respectively couples the optical information signals from its second input port to its second output port.

13. The receiver apparatus according to claim 12, further comprising fault detection means for detecting a fault in the operation of any one of said primary receivers, wherein said control means controls said optical switches in response to said fault detection means to thereby replace a primary receiver having a detected fault with said back-up receiver.

14. A fiber optics communication system for transmitting and receiving optical information signals over an optical fiber network comprising a plurality of optical fibers, said fiber optics communications system comprising:

a transmitter apparatus located at a first location and including:

(a) primary transmitting lasers for respectively generating optical information signals for communication over optical fibers;

(b) a back-up transmitting laser for generating optical information signals; and (c) transmitter optical switches for coupling the optical information signals from said primary and back-up transmitting lasers to said optical fibers, each said transmitter optical switch having two input ports either of which is connectable to either of two output ports, wherein (1) each transmitter optical switch has a first input port coupled to one of said primary transmitting lasers and a first output port coupled to one of said optical fibers, (2) a first transmitter optical switch has a second input port coupled to said back-up transmitting laser, (3) a second transmitter optical switch different than the first transmitter optical switch has a second output port coupled to a signal termination point, and (4) the transmitter optical switches other than said second transmitter optical switch each have a second output port coupled to a second input port of another transmitter optical switch;

a receiver apparatus located at a second location remote from said first location and including:

(a) primary receivers for respectively receiving optical information signals communicated over said optical fibers;

(b) a back-up receiver for receiving optical information signals; and (c) receiver optical switches for coupling the optical information signals from said optical fibers to said primary and back-up receivers, each said receiver optical switch having two input ports either of which is connectable to either of two output ports, wherein (1) each receiver optical switch has a first input port coupled to one of said optical fibers and a first output port coupled to one of said primary receivers, (2) a first receiver optical switch has a second input port coupled to a null terminal, (3) a second receiver optical switch different than the first receiver optical switch has a second output port coupled to said back-up receiver, and (4) the receiver optical switches other than said second receiver optical switch each have a second output port coupled to a second input port of another receiver optical switch;

transmitter apparatus control means for controlling said transmitter optical switches in accordance with conditions at said first and second locations such that optical information signals generated by said back-up transmitting laser are selectively outputable to any of said optical fibers; and receiver apparatus control means for controlling said receiver optical switches in accordance with conditions at said first and second locations such that optical information signals from any one of said optical fibers are selectively receivable by said back-up receiver.

15. A method of transmitting optical information signals over an optical fiber network comprising a plurality of optical fibers using a transmitter apparatus having primary transmitting lasers for respectively generating optical information signals for communication over said optical fibers and a back-up transmitting laser for generating optical information signals, the method comprising the step of:

arranging optical switches, each said optical switch having two input ports either of which is connectable to either of two output ports, for coupling the optical information signals from said primary and back-up transmitting lasers to said optical fibers such that (1) each optical switch has a first input port coupled to one of said primary transmitting lasers and a first output port coupled to one of said optical fibers, (2) a first optical switch has a second input port coupled to said back-up transmitting laser, (3) a second optical switch different than the first optical switch has a second output port coupled to a signal termination point, and (4) the optical switches other than said second optical switch each have a second output port coupled to a second input port of another optical switch thereby forming second output-second input connections; and controlling said optical switches such that optical information signals generated by said back-up transmitting laser are selectively outputable to any of said optical fibers.

16. The method of transmitting according to claim 15, wherein each of said optical switches has a first state wherein its first input port feeds its first output port and its second input port feeds its second output port and a second state wherein its first input port feeds its second output port and its second port feeds its first output port, and wherein said step of arranging comprises:

connecting the second output port-second input port connections in a daisy chain in which said first optical switch is the first optical switch in said daisy chain, said second optical switch is the last optical switch in said daisy chain, and the other optical switches are daisy chained in succession between said first and said second optical switches such that optical information signals generated by said back-up transmitting laser may be coupled from one switch to another in said daisy chain via the second output-second input connections.

17. The method of transmitting according to claim 16, wherein said step of controlling comprises selectively controlling a selected optical switch of said optical switches to be in the second state and controlling each of the other optical switches to be in the first state such that;
(1) said selected optical switch couples the optical information signals generated by said back-up transmitting laser, which optical information signals are coupled to said selected optical switch via the second output-second input connections of any optical switches preceding said selected optical switch in said daisy chain, from its second input port to its first output port and thereby to the optical fiber coupled thereto, and couples the optical information signals generated by the primary transmitter coupled to its first input port to its second output and thereby to the signal termination point via the second output-second input connections of any succeeding optical switches in said daisy chain, and
(2) each optical switch other than said selected optical switch couples the optical information signals generated by the primary transmitter coupled to its first input port to its first output port and thereby to the optical fiber coupled thereto.

18. The method of transmitting according to claim 17, further comprising the step of:
detecting a fault in the operation of any one of said primary transmitting lasers, and
wherein said step of controlling said optical switches further comprises controlling said optical switches to replace a primary transmitting laser having a detected fault with said back-up transmitting laser.

19. The method of transmitting according to claim 16, wherein said step of controlling comprises selectively controlling a selected one of said optical switches and each optical switch preceding said selected optical switch in said daisy chain to be in the second state and controlling each optical switch succeeding said selected optical switch in said daisy chain to be in the first state such that;
(1) said selected optical switch and each said optical switch preceding said selected optical switch in said daisy chain respectively couples the optical information signals generated by the primary transmitter to which it is coupled from its first input port to its second output port and thereby to the second input port of the next succeeding optical switch in said daisy chains or to the signal termination point in the case of the second optical switch, and couples the optical information signals from its second input port to its first output port and thereby to the optical fiber coupled thereto, and
(2) each optical switch succeeding said selected optical switch in said daisy chain couples the optical information signals generated by the primary transmitter to which it is coupled from its first input port to its first output port and thereby to optical fiber coupled thereto, and couples the optical information signals received at its second input port to its second output port and to the second input port of the next succeeding optical switch in said daisy chain, or to the signal termination point in the case of the second optical switch.

20. The method of transmitting according to claim 19, further comprising the step of:
detecting a fault in the operation of any one of said primary transmitting lasers, and
wherein said step of controlling said optical switches further comprises controlling said optical switches to replace a primary transmitting laser having a detected fault with said back-up transmitting laser.

21. A method of receiving optical information signals over an optical fiber network comprising a plurality of optical fibers using primary receivers for respectively receiving optical information signals communicated over said optical fibers and a back-up receiver for receiving optical information signals, the method comprising the steps of:
arranging optical switches, each said optical switch having two input ports either of which is connectable to either of two output ports, for coupling the optical information signals from said optical fibers to said primary and back-up receivers such that (1) each optical switch has a first input port coupled to one of said optical fibers and a first output port coupled to one of said primary receivers, (2) a first optical switch has a second input port coupled to a null terminal, (3) a second optical switch different than the first optical switch has a second output port coupled to said back-up receiver, and (4) the optical switches other than said second optical switch each have a second output port coupled to a second input port of another optical switch thereby forming sound output-second input connections; and
controlling said optical switches such that optical information signals from any one of said optical fibers are selectively receivable by said back-up receiver.

22. The method of receiving according to claim 21, wherein each of said optical switches has a first state wherein its first input port feeds its first output port and its second input port feeds its second output port and a second state wherein its first input port feeds its second output port and its second port feeds its first output port, and wherein said step of arranging comprises:
connecting the second output-second input connections in a daisy chain in which said first optical switch is the first optical switch in said daisy chain, said second optical switch is the last optical in said daisy chain, and the other optical switches are daisy chained in succession between said first and said second optical switches.

23. The method of receiving according to claim 22, wherein said step of controlling comprises selectively controlling a selected one of said optical switches to be in the second state and controlling each of the other optical switches to be in the first state such that:
(1) said selected optical switch coupled the optical information signals from the optical fiber coupled to its first input port to its second output port and thereby to the back-up receiver via the second output-second input connections of any optical switches succeeding said selected optical switch in said daisy chain, and
(2) each optical switch other than said selected optical switch couples the optical information signals from the optical fibers coupled to its first input port to its first output port and thereby to the primary receiver coupled thereto.

24. The method of receiving according to claim 23, further comprising the step of:

detecting a fault in the operation of any one of said primary receivers, and wherein said step of controlling said optical switches further comprises controlling said optical switches to replace a primary receiver having a detected fault with said back-up receiver.

25. The method of receiving according to claim 22, wherein said step of controlling comprises selectively controlling a selected one of said optical switches and each optical switch succeeding said selected optical switch in said daisy chain to be in the second state and controlling each optical switch preceding said selected optical switch in said daisy chain to be in the first state such that:

(1) said selected optical switch and each said optical switch succeeding said selected optical switch in said daisy chain respectively couples the optical information signals received at its second input port to its first output port and thereby to the primary receiver coupled thereto, and couples the optical information signal from the optical fiber coupled to its first input port to its second output port and thereby to the second input port of the next succeeding optical switch in said daisy chain or to the back-up receiver in the case of said second optical switch, and (2) each optical switch preceding said selected optical switch in said daisy chain respectively couples the optical information signals from the optical fiber coupled to its first input port to its first output port and thereby to primary receiver coupled thereto, and respectively couples the optical information signals from its second port to its second output port and to the next succeeding primary receiver coupled thereto.

26. The method of receiving according to claim 25, further comprising the step of:

detecting a fault in the operation of any one of said primary receivers, and wherein said step of controlling said optical switches further comprises controlling said optical switches to replace a primary receiver having a detected fault with said back-up receiver.

27. A method of transmitting and receiving optical information signals over an optical fiber network in a fiber optics communication system comprising a plurality of optical fibers, a transmitter apparatus located at a first location, and a receiver apparatus located at a second location remote from said first location, wherein said transmitter apparatus includes primary transmitting lasers for respectively generating optical information signals for communication over said optical fibers and a back-up transmitting laser for generating optical information signals, and said receiver apparatus includes primary receivers for respectively receiving optical information signals communicated over said optical fibers and a back-up receiver for receiving optical information signals, the method comprising the steps of:

arranging transmitter optical switches, each said transmitter optical switch having two input ports either of which is connectable to either of two output ports, for coupling the optical information signals from said primary and back-up transmitting lasers to said optical fibers such that (1) each transmitter optical switch has a first input port coupled to one of said primary transmitting lasers and a first output port coupled to one of said optical fibers, (2) a first transmitter optical switch has a second input port coupled to said back-up transmitting laser, (3) a second transmitter optical switch different than the first transmitter optical switch has a second output port coupled to a signal termination point, and (4) the transmitter optical switches other than said second transmitter optical switch each have a second output port coupled to a second input port of another transmitter optical switch;

arranging receiver optical switches, each said receiver optical switch having two input ports either of which is connectable to either of two output ports, for coupling the optical information signals from said optical fibers to said primary and back-up receivers such that (1) each receiver optical switch has a first input port coupled to one of said optical fibers and a first output port coupled to one of said primary receivers, (2) a first receiver optical switch has a second input port coupled to a null terminal, (3) a second receiver optical switch different than the first receiver optical switch has a second output port coupled to said back-up receiver, and (4) the receiver optical switches other than said second receiver optical switch each have a second output port coupled to a second input port of another receiver optical switch;

controlling said transmitter optical switches in accordance with conditions at said first and second locations such that optical information signals generated by said back-up transmitting laser are selectively outputable to any of said optical fibers; and controlling said receiver optical switches in accordance with conditions at said first and second locations such that optical information signals from any one of said optical fibers are selectively receivable by said back-up receiver.

* * * * *